(12) United States Patent
Shaylor et al.

(10) Patent No.: US 6,446,084 B1
(45) Date of Patent: Sep. 3, 2002

(54) OPTIMIZING SYMBOL TABLE LOOKUPS IN PLATFORM-INDEPENDENT VIRTUAL MACHINES

(75) Inventors: Nik Shaylor, Newark; Antero K. P. Taivalsaari, Cupertino, both of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/158,415

(22) Filed: Sep. 22, 1998

(51) Int. Cl.[7] .............................................. G06F 17/00
(52) U.S. Cl. ........................ 707/200; 709/313; 709/319
(58) Field of Search ............ 707/1–206; 709/100–332; 717/151–153, 140, 114–118; 711/6

(56) References Cited

U.S. PATENT DOCUMENTS

| | | | |
|---|---|---|---|
| 5,815,718 A | | 9/1998 | Tock .............................. 717/5 |
| 5,920,720 A | | 7/1999 | Toutonghi et al. .............. 717/5 |
| 5,923,878 A | | 7/1999 | Marsland ....................... 717/4 |
| 6,115,719 A | * | 9/2000 | Purdy et al. ................. 707/100 |
| 6,119,125 A | * | 9/2000 | Gloudeman et al. ........ 709/301 |

OTHER PUBLICATIONS www. ittc.ukans.edu/~rsarav/jvm_report/node9.html.*
Publication entitled "The Java Virtual Machine Specification", Chapters 4–5, http://java.sun.com/docs/books/vm-spec/html/classfile.doc.html.
Sun Microsystems, Inc.: "Java Virtual Machine Specification 1.0" http://www.sunsite.ee/java/vmspec.1995, XP002128310 Mountain View, CA 94043–1100, USA paragraph OA.1!.
Venners, Bill: "Inside the Java 2 Virtual Machine (Enterprise Computing)" http://www.artima.com/insidejvm/blurb.html, Dec. 17, 1999, XP002128311 p. 2, line 14–line 33 p. 12, line 35—p. 14, line 11 & Venners, Bill: Inside the Java Virtual Machine (Java Master Series) Dec. 1997, McGraw–Hill, USA.

* cited by examiner

*Primary Examiner*—David Jung
(74) *Attorney, Agent, or Firm*—Park, Vaughan & Fleming LLP

(57) ABSTRACT

One embodiment of the present invention provides a method for increasing performance of code executing on a platform-independent virtual machine. The method operates by receiving a request to resolve an entry in a symbol table at run-time, wherein resolving the entry requires multiple lookups into the symbol table. It next determines if the entry has previously been resolved. If so, the system returns a direct pointer to a runtime structure associated with the entry, which was returned during a previous resolution of the entry. If not, the system resolves the entry through multiple lookups into the symbol table to produce a direct pointer to the runtime structure, and replaces the entry with the direct pointer. In a variation on the above embodiment, the symbol table assumes the form of a constant pool within an object-oriented class file defined within the JAVA programming language. The present invention speeds up constant pool resolution substantially without requiring a significant amount of additional space. Therefore, the present invention is especially valuable for embedded JAVA systems or other applications that have strict size limitations.

24 Claims, 4 Drawing Sheets

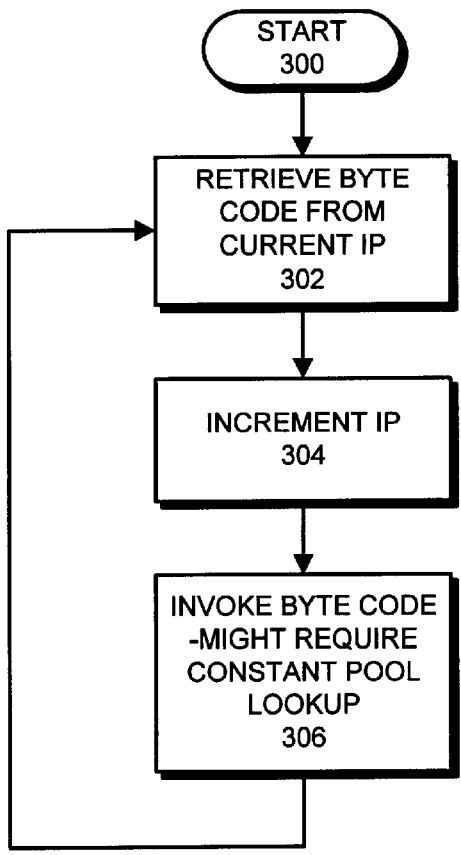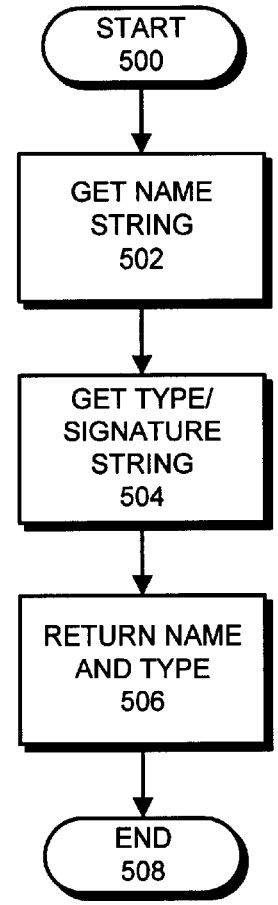
FIG. 3
FIG. 5

```
class Graphics { . . .
        void drawPixel(int x, int y) . . .
        . . .
}
```
FIG. 6A
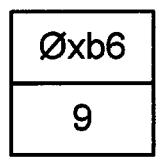
FIG. 6B
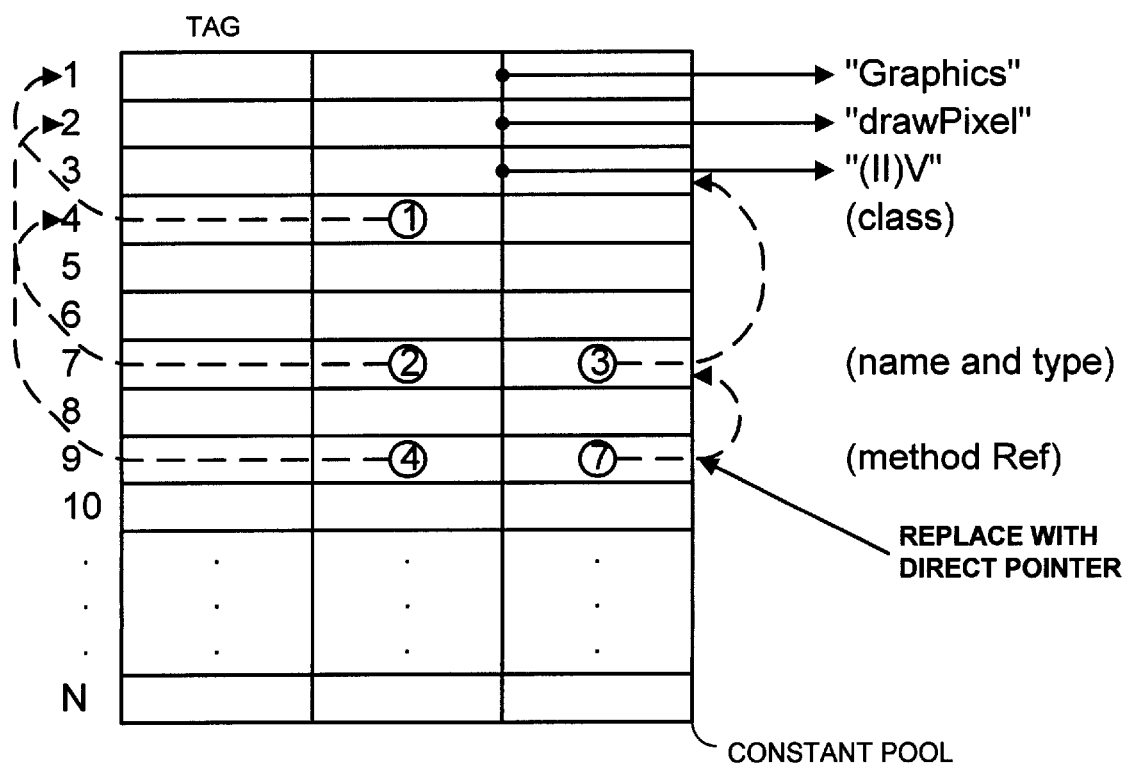
FIG. 6C

US 6,446,084 B1

OPTIMIZING SYMBOL TABLE LOOKUPS IN PLATFORM-INDEPENDENT VIRTUAL MACHINES

COPYRIGHT NOTICE PURSUANT TO 37 C.F.R. § 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to platform-independent virtual machines for computer systems. More specifically, the present invention relates to a space-efficient mechanism for improving the speed of lookups of symbolic information related to functions, variables and object-oriented classes on platform-independent virtual machines.

2. Related Art

The recent proliferation of computer networks such as the Internet has lead to the development of computer languages, such as the JAVA™ programming language distributed by Sun Microsystems, Inc. of Palo Alto, Calif. One important feature of the JAVA programming language is the way in which it allows components of a program to be loaded dynamically at runtime. This is accomplished by storing the components of the program as "class files" that can be easily transferred over a network such as the Internet to remote computer nodes. On the remote nodes, a platform-independent virtual machine can execute the program components stored within the class files.

An essential part of a JAVA classfile is the "constant pool," which is a type of symbol table that stores symbolic information for the associated JAVA class. This allows the JAVA virtual machine (JVM) to dynamically resolve references to functions, variables and other classes at runtime.

Sun, the Sun logo, Sun Microsystems, and Java are trademarks or registered trademarks of Sun Microsystems, Inc. in the United States and other countries.

Unfortunately, constant pool resolution is an expensive, time-consuming operation that occurs very frequently when JAVA programs are run. Most JVMs utilize certain techniques to reduce the need for such constant pool lookups. One commonly used technique is to introduce so-called "quick" bytecodes. This is done by dynamically replacing those JAVA bytecodes that necessitate a constant pool lookup with other "quick" bytecodes that do not require a constant pool lookup, but instead contain a direct pointer to the desired runtime structure. This replacement is performed dynamically when the original bytecode is executed and the associated constant pool references are resolved for the first time. The second time the virtual machine encounters the same code it no longer has to perform the constant pool lookups.

Even simple optimizations such as quick bytecodes usually result in 2–4 times faster execution time. However, these techniques make the virtual machine larger. The code needed to implement quick bytecodes typically increases the size of the virtual machine by at least 5–10 kilobytes, often substantially more if special cache areas are allocated to store the original bytecode sequences. Consequently, these techniques may not be practical for those applications where it is important to have the smallest possible JVM.

Another solution is to provide JVMs with a Just-In-Time (JIT) compiler. This type of system can avoid constant pool lookups by dynamically compiling JAVA bytecodes and the necessary constant pool information into machine code. However, JIT compilers typically require hundreds of kilobytes of additional memory space at the minimum. Consequently, they are completely unsuitable for embedded systems where the virtual machine has to be as small as possible.

What is needed is a space-efficient mechanism for improving the performance of the constant pool lookup process for platform-independent virtual machines.

SUMMARY

One embodiment of the present invention provides a method for increasing performance of code executing on a platform-independent virtual machine. The method operates by receiving a request to resolve an entry in a symbol table at run-time, wherein resolving the entry requires multiple lookups into the symbol table. It next determines if the entry has previously been resolved. If so, the system returns a direct pointer to a runtime structure associated with the entry, which was returned during a previous resolution of the entry. If not, the system resolves the entry through multiple lookups into the symbol table to produce a direct pointer to the runtime structure, and replaces the entry with the direct pointer. In a variation on the above embodiment, the symbol table assumes the form of a constant pool within an object-oriented class file defined within the JAVA programming language. The present invention speeds up constant pool resolution substantially without requiring a significant amount of additional space. Therefore, the present invention is especially valuable for embedded JAVA systems or other applications that have strict size limitations.

BRIEF DESCRIPTION OF THE FIGURES

FIG. 3 is a flow chart illustrating how bytecodes are executed in accordance with an embodiment of the present invention.

FIG. 5 is a flow chart illustrating operations of name and type resolution subroutine in accordance with an embodiment of the present invention.

FIG. 6A presents an example of a piece of code defines an object-oriented programming class in accordance with an embodiment of the present invention.

FIG. 6B illustrates a single instruction in a stream of bytecodes in accordance with an embodiment of the present invention.

FIG. 6C illustrates how the bytecode illustrated in FIG. 6B is resolved in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave.

In the following disclosure and preceding discussion, many of the structures are described in terms of the JAVA programming language and supporting utilities. However, the present invention is not limited to implementations involving JAVA programming language. The present invention applies to any programming environment that supports platform-independent virtual machines. Hence, any mention of a JAVA programming language feature or associated utility is meant to apply to analogous structures in other systems that support program execution on platform-independent virtual machines.

Computer System

Figure 1:
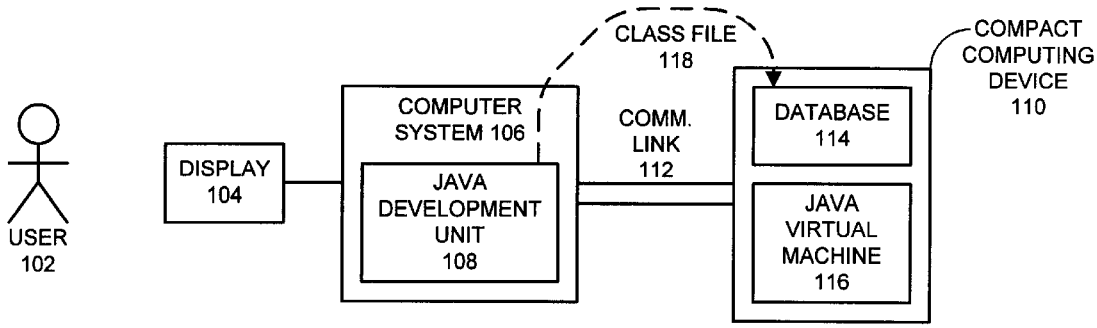
FIG. 1 illustrates a computer system that loads a class file onto a compact computing device in accordance with an embodiment of the present invention.

FIG. 1 illustrates one embodiment of a computer system 106, which loads a class file onto a compact computing device 110 in accordance with an embodiment of the present invention. In FIG. 1, computer system 106 may be any type of computer system capable of executing an application program. This includes, but is not limited to, a personal computer, a workstation, a mainframe computer, and even a device controller. Computer system 106 contains JAVA development unit 108, which includes programming tools for developing JAVA applications. A user 102 operates computer system 106 and views the output of computer system 106 through display 104.

Computer system 106 is coupled to compact computing device 110 through a communication link 112. Compact computing device 110 may be any type of computing device including a limited amount of storage for code and data.

This may include, but is not limited to, a personal organizer, such as a PALMPILOT™ produced by the 3COM Corporation of Santa Clara, Calif. Compact computing device 110 may also include, but is not limited to, a laptop computer system, a palm-sized computer system, and a device controller. Compact computing device 110 may also include computing devices that are embedded within other devices, such as a pager, a cellular telephone, a television, or an automobile. In general, compact computing device 110 may include any embedded computing device, including any computing devices embedded an electrical, mechanical or other system or appliance.

Communication link 112 may include any type of permanent or temporary communication channel that can be used to transfer data from computer system 106 to compact computing device 110. This may include, but is not limited to, a computer network such as an Ethernet, a wireless communication network or a telephone line. In some embodiments of the present invention, compact computing device 110 is designed to operate while it is disconnected from communication link 112.

Compact computing device 110 includes database 114, for storing code and data, as well as a platform-independent virtual machine 116 for processing platform-independent programs received across communication link 112.

During operation, class file 118 is created within JAVA development unit 108. Class file 118 contains components of a platform-independent program to be executed in compact computing device 110. For example, class file 118 may include methods and fields associated with an object-oriented class. Class file 118 additionally includes constant pool 206 as is described in more detail below. Next, class file 118 is transferred from JAVA development unit 108 through communication link 112, and into database 114 within compact computing device 110. Finally, virtual machine 116 executes a program that accesses components within class file 118. These accesses cause time-consuming constant pool resolution operations, which are optimized by this invention.

Class File and Run Time Structures

Figure 2:
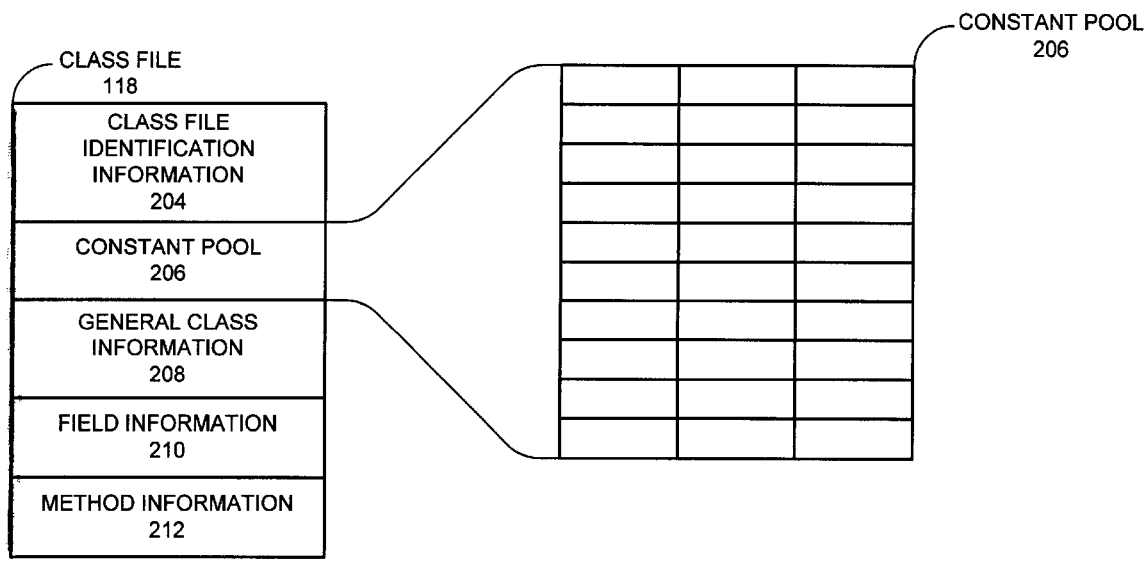
FIG. 2 illustrates the structure of a class file and associated runtime structures in accordance with an embodiment of the present invention.
Figure 2:
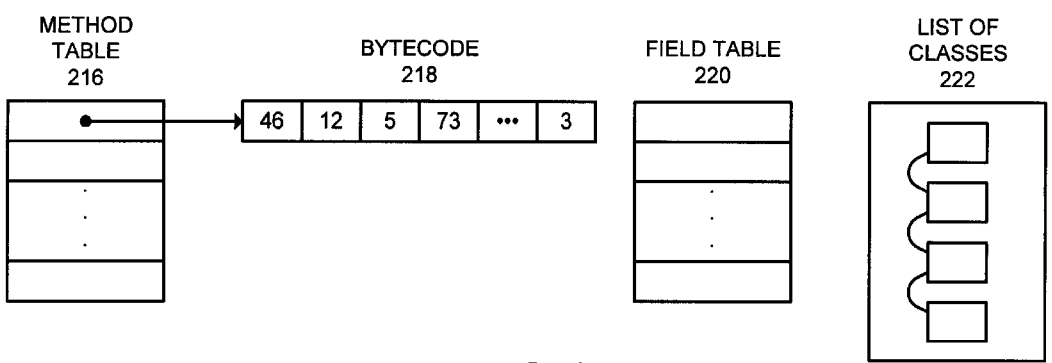

FIG. 2 illustrates the structure of class file 118 and associated runtime structures in accordance with an embodiment of the present invention. FIG. 2 includes class file 118, method table 216, field table 220 and list of classes 222. Class file 118 includes a number of different types of information related to a particular class, including class file identification information 204, constant pool 206, general class information 208, field information 210 and method information 212. Class identification information 204 contains information that identifies the particular class. Constant pool 206 includes a number of entries for storing symbolic information for the particular class. General class information 208 includes information that identifies the superclass to which the particular class belongs. Field information 210 includes information relating to the various variables and data structures associated with the particular class. Method information 212 includes the actual bytecodes to implement the methods defined for the particular class.

Method table 216 includes pointers to the actual bytecodes that implement the methods defined within the particular class. This includes bytecode 218, which includes a string of bytes to be executed by virtual machine 116 in FIG. 1.

Field table 220 includes the values of fields associated with the particular class. The entries in field table 220 are typically stored as data values. However, they may additionally include pointers to data values.

Finally, list of classes 222 includes a list of classes that have already been loaded into virtual machine 116 in FIG. 1. Once these classes are loaded, components within the classes can be executed by virtual machine 116.

The structures illustrated in FIG. 2 operate as follows. During execution of a bytecode in virtual machine 116, references are generated to various methods, interface methods, fields or classes. These references are resolved through accesses to constant pool 206. When a constant pool entry is resolved for the first time, the data fields of the entry are replaced with a pointer to the class, method, field or interface method structure that was returned as a result of the resolution. Additionally, the corresponding tag in the constant pool entry is modified to indicate that the constant pool entry has been resolved. The next time virtual machine 116 accesses the same constant pool entry, it simply reads the value stored in the data fields of the entry instead of performing a full constant pool lookup. Note that this requires to additional data storage space. Also note that modifying the tag field adds no additional storage overhead to the constant pool.

Only a few tens of bytes of code are needed for implementing the extra caching instructions. In terms of execution speed the solution requires only a few extra logical AND and OR operations for checking the cache status. This overhead is easily offset by a dramatic speed-up in constant pool access.

The proposed technique adds some extra requirements for the garbage collector of the virtual machine. In particular, the garbage collector must be informed of the possible pointers in the constant pool.

Modified Resolution Process

FIG. 3 is a flow chart illustrating how bytecodes are executed in accordance with an embodiment of the present invention. The execution engine within the platform-independent virtual machine 116 first retrieves a byte code from the current instruction pointer (IP) (state 302). After the byte code is retrieved, the instruction pointer is incremented to point to a subsequent byte code (state 304). Next, the retrieved byte code is invoked. This may generate a lookup in constant pool 206. If so, a constant pool resolution is performed, which may involve multiple lookups in constant pool 206 (state 306). Performing these multiple lookups can be very time-consuming. After the byte code is invoked, the system returns to state 302 to retrieve another byte code. The above process is repeated for subsequent byte codes executed by virtual machine 116.

Figure 4:
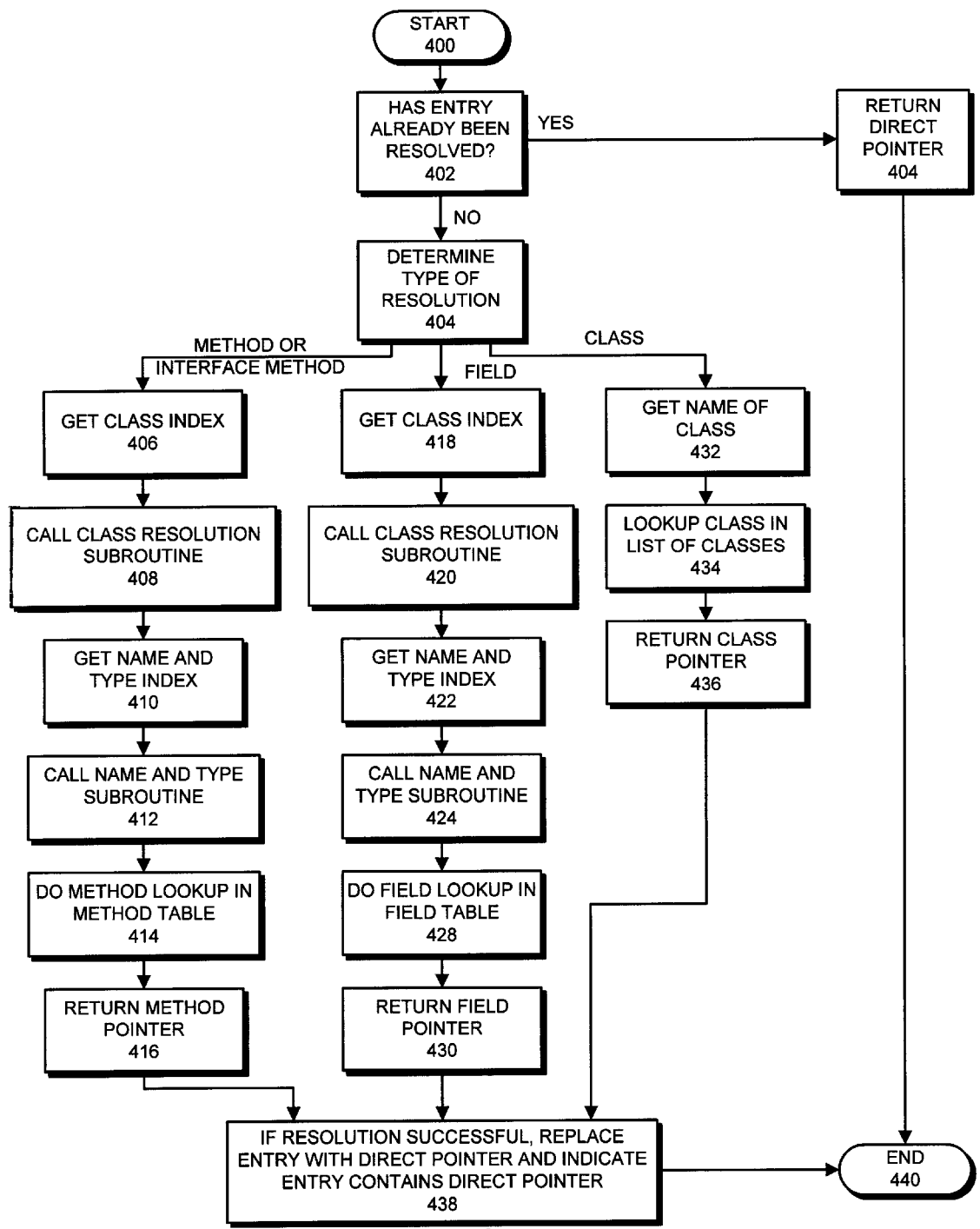
FIG. 4 is a flow chart illustrating a modified constant pool resolution process in accordance with an embodiment of the present invention.

FIG. 4 is a flow chart illustrating a modified constant pool resolution process in accordance with an embodiment of the present invention. The system first determines if the accessed entry in the constant pool has already been resolved (state 402). If so, the system returns a direct pointer to the structure specified by the entry, which was returned during a previous resolution of the entry (state 403). The constant pool resolution is complete. Otherwise, the system takes one of several courses of action depending upon what is contained in the entry. If the constant pool entry corresponds to a variable, the constant pool entry contains either the value of the variable or a direct pointer to the variable. Hence, no optimization is required to reduce the number of constant pool lookups. (This case is not shown.) If the constant pool entry requires multiple constant pool lookups, the system takes one of several actions depending upon if the constant pool entry corresponds to a method, an interface method, a field or a class (state 404).

If the entry corresponds to a method (or an interface method), the system first determines the class associated with the method by retrieving an index for the class (state 406) and then calling a class resolution subroutine to resolve the class (state 408). Next, the system retrieves an index for the name and type of the method (state 410), and uses this index to call a name and type subroutine to resolve the name and type (state 412). The system uses the class pointer, the method name and the type information (signature) to lookup a method pointer in method table 216 from FIG. 2 (state 414). Finally, the system returns this method pointer (state 416). An example code listing for the method resolution process appears in Table 1.

If the entry corresponds to a field, the system first determines the class associated with the field by retrieving an index for the class (state 418). The system uses this index to call the class resolution subroutine to resolve the class (state 420). Next, the system retrieves an index for the name and type of the field (state 422), and uses this index to call a name and type subroutine to resolve the name and type (state 424). The system uses the class pointer, the field name and the type information (signature) to lookup a field pointer in field table 220 from FIG. 2 (state 428). Finally, the system then returns the field pointer (state 430). The above field resolution process is essentially the same as the method resolution process, which appears in Table 1.

TABLE 1

```
/*======================================================================
 * Copyright (c) 1998 Sun Microsystems, Inc. All Rights Reserved
 * FUNCTION:     resolveMethodReference()
 * TYPE:     public instance-level operation
 * OVERVIEW:     Given an index to a CONSTANT_Methodref or
 *        CONSTANT_InterfaceMethodref, get the Method that the index refers to.
 * INTERFACE:
 * parameters: constant pool pointer, constant pool index
 * returns:   method pointer
 *=====================================================================*/
METHOD resolveMethodReference(POOLE constantPool, unsigned short cpIndex) {
POOLE thisEntry = &constantPool[cpIndex];
METHOD thisMethod = NIL;
#if CACHECONSTANTPOOLENTRIES
    // Check if this entry has already been resolved (cached)
    // If so, simply return the earlier resolved class
    if (thisEntry->tag & CP_CACHEBIT) return ((cpCache*)thisEntry->method;
#endif
// Resolve the class part of the reference
short classIndex   = ((cpMethodRef*)thisEntry)->classIndex;
CLASS thisClass  = resolveClassReference(constantPool, classIndex);
// Resolve the name and type part
short nameTypeIndex = ((cpMethodRef*)thisEntry->nameTypeIndex;
char* methodName; // used as return value below
char* signature; // ditto
getNameAndType(constantPool, nameTypeIndex, methodName, signature);
// Perform method lookup on the basis of class, name and type
if (thisClass && methodName && signature) {
thisMethod = lookupMethod(thisClass, methodName, signature);
}
```

TABLE 1-continued

```
#if CACHECONSTANTPOOLENTRIES
    // Cache the value so that we don't ever have to resolve this entry again
    if (thisMethod) {
        thisEntry->tag = CP_CACHEBIT;
        ((cpCache*)thisEntry)->method = thisMethod;
    }
#endif
    return thisMethod;
}
```

If the entry corresponds to a class, the system first retrieves the name of the class (state 432). The system next looks up the class in the list of classes 222 illustrated in FIG. 2 (state 434). Finally, the system returns a class pointer (state 436). An example code listing for the class resolution process appears in Table 2.

EXAMPLE

FIGS. 6A, 6B and 6C illustrate an example of the constant pool resolution process. FIG. 6A presents a piece of code that defines an object-oriented programming class called "Graphics." The class "Graphics" contains a method called

TABLE 2

```
/*======================================================================
 * Copyright (c) 1998 Sun Microsystems, Inc. All Rights Reserved.
 * FUNCTION:    resolveclassReference()
 * TYPE:        public instance-level operation
 * OVERVIEW:    Given an index to a CONSTANT_Class, get the class that the index refers to.
 * INTERFACE:
 * parameters: constant pool pointer, constant pool index
 * returns: class pointer
 *======================================================================*/
CLASS resolveClassReference(POOLE constantPool, unsigned short cpIndex) {
    POOLE thisEntry = &constantPool[cpIndex];
    CLASS thisClass;
#if CACHECONSTANTPOOLENTRIES
    // Check if this entry has already been resolved (cached)
    // If so, simply return the earlier resolved class
    if(thisEntry->tag & CP_CACHEBIT) return ((cpCache*)thisEntry)->clazz;
#endif
    // Get class name
    char* className = getCPUtf8(constantPool, ((cpClass*)thisEntry)->nameindex);
    // If class is of array type, return java.lang.Object
    // Otherwise get the referenced class, loading it if necessary
    if (*className == '[')
        thisClass = JavaLangObject;
    else thisClass = getClass(className);
#if CACHECONSTANTPOOLENTRIES
    // Cache the value so that we don't ever have
    // to resolve this entry again
    if(thisClass) {
        thisEntry->tag |= CP_CACHEBIT;
        ((cpCache*)thisEntry)->clazz = thisClass;
    }
#endif
    return thisClass;
}
```

After the direct pointer to either the method, interface method, field or class is returned in states 416, 430 and 436, the system replaces the originally accessed constant pool entry with the direct pointer (state 438). The system also modifies the tag (status indicator) associated with the entry to indicate that the entry contains a direct pointer. The above process is repeated for additional constant pool resolutions.

FIG. 5 is a flow chart illustrating the name and type resolution subroutine in accordance with an embodiment of the present invention. This name and type subroutine is called at states 412 and 424 in the flow chart illustrated in FIG. 4. The system first retrieves a string containing the name (state 502). Next, the system retrieves a type/signature string associated with the name (state 504). Finally, the system returns the name and type (state 508).

"drawPixel," which takes in two integer parameters "x" and "y," and returns a void value.

The object-oriented code which ultimately calls the method "drawpixel" is translated into a compact representation (known as a bytecode) for execution on platform-independent virtual machines. For example, a program instruction that calls the method "drawPixel" may be compiled into a bytecode in a stream of bytecodes using the JAVA programming environment as is illustrated in FIG. 6B. FIG. 6B illustrates a single instruction. The first byte contains the instruction "Oxb6," which specifies an "invokevirtual" operation, which invokes a method that is specified by a following constant pool index. In the illustrated example, the following constant pool index is a "9," which indicates that the method is specified by the ninth entry of the associated constant pool.

FIG. 6C illustrates the process of resolving the bytecode illustrated in FIG. 6B. More specifically, FIG. 6C contains a constant pool 206, including entries 1 through N, wherein each entry includes a tag, indicating what type of information is stored in the entry, along with the information itself. In the JAVA programming language there are 11 different kinds of constant pool entry types, identified by a one-byte tag field at the beginning of each entry. For instance, there is a specific entry type for storing class, method, interface method, field and string references. The data fields stored after the tag field can vary depending on the type of the constant pool entry. In some entries the data fields contain indices to other constant pool entries. The fact that each constant pool entry may refer to multiple other constant pool entries, which in turn may recursively refer to further entries makes constant pool resolution a time-consuming operation.

The resolution process illustrated in FIG. 6C operates as follows. The bytecode in FIG. 6B specifies that a method reference starting at the ninth entry of the constant pool is to be resolved. The system first examines the tag field of the ninth entry to determine if the entry has already been resolved. If so, the system simply uses the direct pointer stored in the entry to perform the method reference.

If not, the entry must be resolved. In order to resolve the entry, the contents of the ninth entry is first retrieved. In the illustrated example, the ninth entry includes the numbers "4" and "7," which two are additional indexes into constant pool 206. The system then retrieves the fourth entry of constant pool 206, which includes a class identifier along with number "1," which is also an index into constant pool 206. The system next retrieves the first entry of constant pool 206, which contains a pointer to a string containing the name of the class "Graphics."

The system also retrieves the seventh entry of constant pool 206. This entry includes the numbers "2" and "3," which are also indexes in to constant pool 206. The system next retrieves the contents of the second entry, which contains a pointer to a string containing the name of the method, "drawPixel." The system further retrieves the contents of the third entry, which contains a pointer to a string specifying type information for the method. This string "(II)V" indicates that the method takes two integer input parameters and returns a void result. At this point it is possible to perform the method lookup in a related method table to return a direct pointer to the method bytecode.

Finally, the direct pointer is stored in the constant pool entry so that it can be used in future constant pool lookups. In this example, the direct pointer is stored in entry 9. The tag field associated with entry 9 is additionally modified to indicate that the constant pool entry contains a direct pointer.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for increasing performance of code executing on a virtual machine, comprising:
   receiving a class file for a class including a constant pool;
   executing an instruction on the virtual machine that generates a request to resolve an entry in the constant pool, wherein resolving the entry requires at least one lookup in the constant pool;
   examining a status indicator associated with the entry to determine if the entry has previously been resolved;
   if the entry has been previously resolved, returning a pointer to a structure associated with the entry, which was returned during a previous resolution of the entry; and
   if the entry has not been previously resolved,
      resolving the entry through at least one lookup to the constant pool to produce a pointer to the structure associated with the entry,
      replacing the entry in the constant pool with the pointer, wherein replacing the entry in the constant pool with the pointer does not require any additional memory, and
      modifying the status indicator associated with the entry to indicate that the entry contains a pointer.

2. A method for increasing performance of code executing on a virtual machine, comprising:
   receiving a request to resolve an entry in a symbol table associated with a class, wherein resolving the entry requires at least one lookup in the symbol table;
   determining if the entry has previously been resolved;
   if the entry has been previously resolved, returning a pointer to a structure associated with the entry, which was returned during a previous resolution of the entry; and
   if the entry has not been previously resolved, resolving the entry through at least one lookup to the symbol table to produce a pointer to the structure, and replacing the entry with the pointer, wherein replacing the entry with the pointer does not require any additional memory.

3. The method of claim 2, wherein the symbol table includes a constant pool, which is part of a class file of a platform independent program.

4. The method of claim 2, further comprising receiving the class file from a remote node across a communication channel.

5. The method of claim 4, further comprising decoupling a platform on which the virtual machine operates from the communication channel prior to receiving the request to resolve the entry in the symbol table.

6. The method of claim 2, wherein the act of resolving the entry includes performing a method lookup that returns a pointer to a method associated with the class.

7. The method of claim 2, wherein the act of resolving the entry includes performing a field lookup that returns a pointer to a field associated with the class.

8. The method of claim 2, wherein the act of resolving the entry includes performing a class lookup that returns a pointer to the class.

9. The method of claim 2, further comprising executing an instruction on the virtual machine that generates the request to lookup an entry in the symbol table.

10. The method of claim 9, wherein executing the instruction includes executing a bytecode of a platform independent program.

11. The method of claim 2, further comprising, if the entry is replaced with the pointer, modifying a status indicator associated with the entry to indicate that the entry contains the pointer.

12. The method of claim 2, wherein determining if the entry has previously been resolved includes examining a status indicator associated with the entry.

13. A computer readable storage medium storing instructions that when executed by a computer cause the computer to perform a method for increasing performance of code executing on a virtual machine, comprising:

receiving a request to resolve an entry in a constant pool within a class file for a class, wherein resolving the entry requires at least one lookup in the constant pool;

determining if the entry has previously been resolved;

if the entry has been previously resolved, returning a pointer to a structure associated with the entry, which was returned during a previous resolution of the entry; and if the entry has not been previously resolved, resolving the entry through at least one lookup in the constant pool to produce a pointer to the structure, and replacing the entry with the pointer, wherein replacing the entry with the pointer does not require any additional memory.

14. An apparatus for increasing performance of code executing on a virtual machine, comprising:

a lookup mechanism that looks up an entry in a constant pool within a class file for a class, wherein resolving the entry may require at least one lookup in the constant pool;

a status indicator, associated with the entry, which indicates if the entry has previously been resolved;

a bypassing mechanism, that returns a pointer to a structure associated with the entry if the entry has been previously resolved; and a resolution mechanism that resolves the entry, if the entry has not been previously resolved, through at least one lookup to the constant pool to produce a pointer to the structure, and that replaces the entry with the pointer, wherein replacing the entry with the pointer does not require any additional memory.

15. The apparatus of claim 14, wherein the constant pool comprises a portion of a class file of a platform independent program.

16. The apparatus of claim 14, further comprising a communication mechanism that receives the class file from a remote node across a communication channel.

17. The method of claim 16, wherein the communication mechanism is configured so that it can be decoupled from the communication channel while code is executing on the virtual machine.

18. The apparatus of claim 14, wherein the resolution mechanism is configured to perform a method lookup that returns a pointer to a method associated with the class.

19. The apparatus of claim 14 wherein the resolution mechanism is configured to perform a field lookup that returns a pointer to a field associated with the class.

20. The apparatus of claim 14, wherein the resolution mechanism is configured to perform a class lookup that returns a pointer to the class.

21. The apparatus of claim 14, further comprising an execution mechanism that executes an instruction on the virtual machine that generates the request to lookup the entry in the constant pool.

22. The apparatus of claim 21, wherein the execution mechanism is configured to execute bytecodes of a platform independent program.

23. The apparatus of claim 14, wherein the resolution mechanism is configured to modify the status indicator to indicate that the entry contains a pointer.

24. An apparatus for increasing performance of code executing on a virtual machine, comprising:

a lookup means, for looking up an entry in a constant pool within a class file for a class, wherein resolving the entry may require at least one lookup in the constant pool;

a status indicator means, associated with the entry, for indicating if the entry has previously been resolved;

a bypassing means for bypassing the lookup to the entry by returning a pointer to a structure associated with the entry if the entry has been previously resolved; and a resolution means, for resolving the entry, if the entry has not been previously resolved, through at least one lookup to the constant pool to produce a pointer to the structure, and replacing the entry with the pointer, wherein replacing the entry with the pointer does not require any additional memory.

* * * * *